(12) United States Patent
Fortunato

(10) Patent No.: US 10,723,067 B2
(45) Date of Patent: Jul. 28, 2020

(54) STEREOLITHOGRAPHY METHOD COMPRISING A VERTICAL COMPENSATION PROCESS, AS WELL AS APPARATUS AND COMPUTER PROGRAM PRODUCT SUITED TO IMPLEMENT SAID METHOD

(71) Applicant: DWS S.R.L., Thiene (IT)

(72) Inventor: Roberto Fortunato, Torrebelvicino (IT)

(73) Assignee: DWS S.R.L., Thiene, Vicenza (IT)

( * ) Notice: Subject to any disclaimer, the term of this patent is extended or adjusted under 35 U.S.C. 154(b) by 574 days.

(21) Appl. No.: 15/320,366

(22) PCT Filed: Jun. 18, 2015

(86) PCT No.: PCT/IB2015/054601
§ 371 (c)(1),
(2) Date: Dec. 20, 2016

(87) PCT Pub. No.: WO2016/001787
PCT Pub. Date: Jan. 7, 2016

(65) Prior Publication Data
US 2017/0190110 A1    Jul. 6, 2017

(30) Foreign Application Priority Data

Jul. 3, 2014    (IT) .................... VI2014A0173

(51) Int. Cl.
*B29C 64/124* (2017.01)
*B33Y 10/00* (2015.01)
(Continued)

(52) U.S. Cl.
CPC .......... *B29C 64/124* (2017.08); *B29C 64/135* (2017.08); *B29C 64/386* (2017.08);
(Continued)

(58) Field of Classification Search
CPC .................................... B29C 64/124
See application file for complete search history.

(56) References Cited

U.S. PATENT DOCUMENTS 5,999,184 A    12/1999    Smalley et al.
2013/0313756 A1    11/2013    Chen et al.

OTHER PUBLICATIONS

International Search Report regarding PCT/IB2015/054601, dated Sep. 21, 2015 (4 pgs.).
(Continued)

*Primary Examiner* — Larry W Thrower
(74) *Attorney, Agent, or Firm* — Husch Blackwell LLP

(57) ABSTRACT

The invention is a stereolithography method for the production of a three-dimensional object (10) through the superimposition of a succession of layers (1-5) obtained by solidifying a liquid material through exposure to predefined radiation (6), comprising the following operations: defining a geometric representation of the layers (1, 2, 3, 4, 5); selecting one or more layers (2) that precede a reference layer (4) in the succession; defining a mask area (9) corresponding to the logical conjunction of the geometric representations of the reference layer (4) and of the selected layers (2) reproduced on the plane of the reference layer (4); exposing the liquid material to the predefined radiation (6) in the mask area (9). According to the method, before defining the mask area (9) the geometric representations of the selected layers (2) are modified in order to extend them with corresponding additional portions (2a) that project with respect to the geometric representations of the corresponding layers (2) as configured before the modification, wherein the additional portions (2a) are defined to compensate for the reduced solidifying effect of the predefined radiation (6) on the liquid material due to its penetration in the liquid material down to the depths corresponding to the layers (2), so that the outline of the portion (Continued)

of the three-dimensional object (10) obtained following the solidification of the group of layers approximates more precisely the outline (11) of the three-dimensional object (10).

18 Claims, 5 Drawing Sheets

(51) Int. Cl.
  *B33Y 50/00* (2015.01)
  *B29C 64/386* (2017.01)
  *B29C 64/135* (2017.01)
  *B29K 105/00* (2006.01)
(52) U.S. Cl.
  CPC ............... *B33Y 10/00* (2014.12); *B33Y 50/00* (2014.12); *B29K 2105/0058* (2013.01)

(56) References Cited

OTHER PUBLICATIONS

Written Opinion of the International Searching Authority regarding PCT/IB2015/054601, dated Sep. 21, 2015 (8 pgs.).

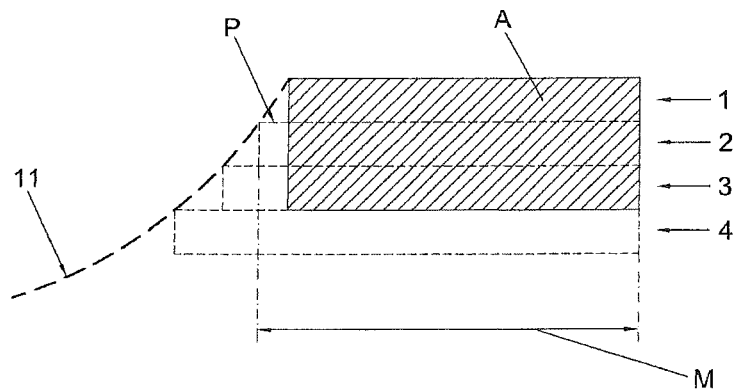
Fig.3 - PRIOR ART
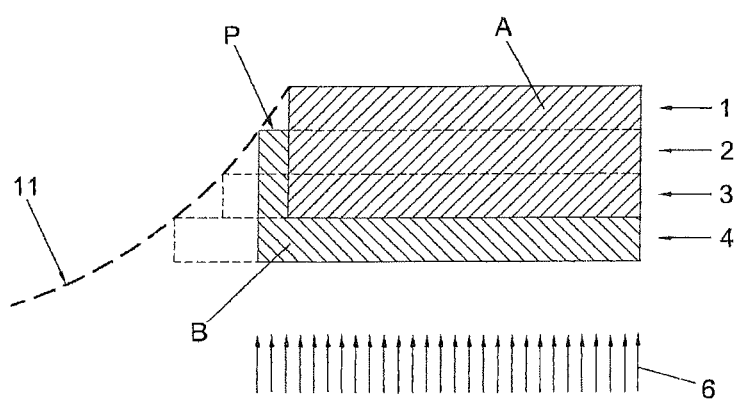
Fig.4 - PRIOR ART
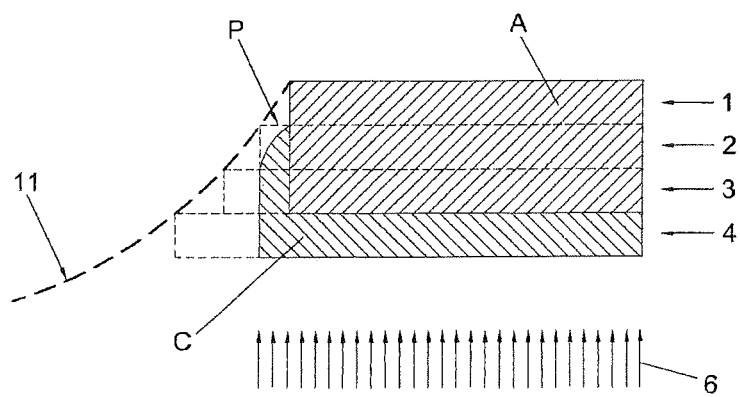
Fig.5 - PRIOR ART

STEREOLITHOGRAPHY METHOD COMPRISING A VERTICAL COMPENSATION PROCESS, AS WELL AS APPARATUS AND COMPUTER PROGRAM PRODUCT SUITED TO IMPLEMENT SAID METHOD

This application claims priority from international application PCT/IB2015/054601, filed Jun. 18, 2015, which is incorporated herein by reference.

DESCRIPTION

The present invention concerns a stereolithography method for producing a three-dimensional object by superimposing a succession of layers of a liquid material that is selectively exposed to predefined radiation capable of solidifying it.

In particular, according to said method the area of exposure of the liquid material to the predefined radiation for the creation of each layer of the object is calculated based on the geometry of the preceding layers of the object itself.

The present invention concerns also an apparatus and a computer program product configured in such a way as to implement said method.

As is known, the stereolithography process makes it possible to produce a three-dimensional object through the superimposition of a succession of layers of the object itself, each one of which is obtained starting from a layer of liquid material that is capable of solidifying following exposure to predefined radiation.

In general, the predefined radiation is a laser beam and the liquid material is a light sensitive resin that under the action of the laser beam polymerizes until it solidifies.

The thickness of the layer of liquid material substantially corresponds to the thickness of the layer to be solidified and said material solidifies when in contact with the previously solidified layer that serves as a support.

According to the stereolithography process, first of all it is necessary to define a geometric representation of the succession of layers of the object.

Said representation in layers is defined, for example, starting from the definition of a succession of section planes arranged parallel to one another and at a mutual distance that corresponds to the thickness required for the layers themselves.

The above is illustrated, only by way of example, in FIG. 1, which shows a side sectional view of a portion of a hypothetical three-dimensional object 10.

In the figure, the section planes X are represented with parallel dash-dot lines.

Each layer is defined as the portion of the object 10 included between two of said mutually adjacent section planes X and perimetrically delimited by a surface that is orthogonal to the section planes and approximates to the corresponding lateral surface of the object.

In FIG. 1, said orthogonal surfaces are represented by means of corresponding broken segments in proximity to the upper left surface of the object, one of which is indicated by 12.

The layers defined in this way appear as rectangles in sectional view, said rectangles being indicated by numbers from 1 to 5 in FIG. 2.

In this example, it is assumed that the laser beam that causes the object to solidify comes from below and that, therefore, each layer is solidified following contact with the underside of the last previously solidified layer.

Therefore, the layer 1 is the first layer to be solidified, the layer 5 is the last layer to be solidified.

The layer of liquid material from which each new layer is made is obtained by immersing the already solidified portion of the object into a tank containing the liquid material, in such a way that the distance of the last solidified layer from the bottom of the tank substantially corresponds to the thickness of the layer to solidify, less a factor that expresses the contraction of the liquid material during its solidification.

The bottom of the tank is transparent to the laser beam, so that the latter can reach the liquid material.

Obviously, the process described above can be applied in a perfectly analogous manner also to a variant embodiment in which the laser beam comes from above, with the clear difference that each new layer is solidified on top of the last previously solidified layer and not under it.

Furthermore, in this variant embodiment the new layer of liquid material is obtained by immersing the already solidified portion of the object in the liquid material, in such a way that the surface of the last solidified layer is arranged at a depth that corresponds to the thickness of the layer to be obtained, less said contraction factor.

The above clearly shows that, in this variant embodiment, the three-dimensional object is produced in an overturned configuration with respect to previous case; therefore, the object shown in FIG. 2 would be produced with the layer 1 in the lowest position and the layer 5 in the highest position.

In both of said variants, in the solidification process of each layer the laser beam is incident on the surface area of the liquid material corresponding to the area of the layer to be solidified.

The solidification process described above poses the drawback that it limits the geometric definition that can be obtained for the three-dimensional object. The drawback just mentioned above is related to the fact that the laser beam penetrates into the liquid material down to a given depth, hereinafter referred to as "solidification depth", within which the power of the laser beam is sufficient to solidify the material and make it adhere to the already solidified portion of the object.

Said solidification depth depends, first of all, on the degree of transparency of the liquid material to the laser beam and on whether the laser beam meets or not an already solidified portion of the object.

More specifically, the already solidified portions of the object are substantially opaque to the laser beam and, therefore, serve as a barrier against any further penetration of the latter into the liquid material.

If, on the contrary, the layer to be solidified includes a portion that projects with respect to the previously solidified layers, the laser beam that is incident on the liquid material at the level of said projecting portion does not find any obstacle to its propagation and, therefore, causes the liquid material to solidify down to a depth corresponding to said solidification depth.

The condition just mentioned above occurs, for example, for all the layers from 2 to 5 represented in FIG. 2, whose left ends project beyond the previous layer, which is solidified immediately before them.

In the cases mentioned above, if the thickness of the layers is smaller than the solidification depth, the exposure of the respective projecting portion to the laser beam causes the liquid material to solidify obtaining a thickness that exceeds the thickness of the layer itself, that is, in areas that do not correspond to the volume of the object to be produced; consequently, the object obtained in this way presents surface distortions.

In order to avoid said distortions, at least for the layers having projecting portions, the respective thicknesses cannot be smaller than the solidification depth defined above.

However, this limitation to the thickness determines a corresponding limitation to the geometric definition of the object, thus making said method unsuitable for making high-definition three-dimensional objects that require the layers to be defined so that their thickness is considerably smaller than the solidification depth.

In the attempt to overcome said drawbacks, a known procedure has been developed that, when applied to said method, makes it possible to correct the geometric distortions described above.

This procedure, called "vertical compensation" or "Z compensation" and described, for example, in the patent document U.S. Pat. No. 5,999,184, consists in postponing the exposure of the projecting portion of the current layer so that it takes place at the same time as the exposure of a successive layer, selected in such a way that the sum of the thicknesses of the current layer, of the successive layer and of all the layers included between these two layers substantially corresponds to the solidification depth of the laser beam.

Owing to the postponed exposure, the projecting portion of any layer is solidified when the layer itself is located at the maximum solidification depth, thus avoiding the undesired solidification of deeper areas of the liquid material. In practice, vertical compensation can be performed by determining a mask area corresponding to the area of the surface of the liquid material that simultaneously faces both the current layer to be solidified and all the layers that, in the given succession, precede the current layer and are arranged at a distance from the current layer that is smaller than the solidification depth. From the mathematical point of view, said mask area can be defined as the logical conjunction of the layers mentioned above, that is, as the intersection of the selected layers, reproduced on the same reference plane, for example on the plane of the current layer.

Said logical conjunction comprises the areas over which all the selected layers extend, while it does not comprise the areas over which at least one of the selected layers does not extend.

The exposure of the current layer to the laser beam is limited only to said mask area.

The result that can theoretically be obtained with the compensation procedure just described above is represented in FIGS. 3 and 4, in which it is assumed that the layer 4 is the current layer (to be solidified) and it is assumed, only by way of example, that the solidification depth is equal to the thickness of three layers.

The hatched area A in FIG. 3 indicates the already solidified portion of the object, while the arrow M indicates the size of the mask area.

FIG. 4 represents the theoretical effect resulting from exposure to the laser beam 6 in the mask area M of FIG. 3, in which the hatching indicating the solidified portion B is oriented in a different manner with respect to that indicating the previously solidified portion A.

In FIG. 4 it is possible to note that the portion P of the layer 2 that projects with respect to the previous layer 1 is solidified exactly during exposure of the layer 4, in such a way that the solidification effect of the laser beam does not exceed vertically the theoretical outline 11, indicated by a dashed line, of the three-dimensional object to be obtained.

It can be understood that the vertical compensation procedure described above makes it possible to define layers that are thinner than the solidification depth and therefore makes it possible to increase the definition of the three-dimensional object compared to the previous method.

However, the procedure just described above poses the drawback that it does not take in consideration the actual effect of the laser beam, which differs from the theoretical behaviour described above.

First of all, the degree of solidification of the liquid material decreases as the depth increases, due to the progressive attenuation to which the laser beam is subjected while passing through the material itself.

This means that the laser beam solidifies the deeper layers of the liquid material only in an incomplete manner.

Secondly, the laser beams typically used in stereolithography are of the so-called "Gaussian" type.

In a Gaussian beam, the energy intensity on the generic cross section of the beam decreases from the centre point, corresponding to the centre axis of the beam, towards the periphery, substantially according to a Gaussian law.

Consequently, the liquid material arranged so that it is spaced from the centre axis of the beam is solidified in a less complete manner compared to the material arranged closer to the centre axis of the beam.

Thirdly, the portions of material that, due to the phenomena described above, are not solidified completely tend to come off during the processing of the object if they are not anchored to an already solidified portion.

Due to the combination of the above mentioned effects, the portion of the liquid material that is solidified in a stable manner is smaller than the theoretical portion represented in FIG. 4.

FIG. 5 shows a non-limiting example of the portion actually solidified during the exposure of the layer 4 to the laser beam 6 in the same mask area M of FIG. 4; in this figure it is possible to observe that the actually solidified portion C differs from the theoretically solidified portion B indicated in FIG. 4. As a whole, said drawback causes a distortion of those surfaces of the object that delimit projecting portions of the latter, with a tendency to push them towards the non-projecting portions.

This phenomenon is particularly important for those surface features of the object whose size can be compared to the solidification depth.

For example, a cylindrical hole whose axis is parallel to the planes of the layers and whose diameter is of the same order of size as the solidification depth will present, in the solid object obtained, a deformed surface in the half hole that is the second one to be created.

Document US 2013/313756 A1 discloses a different method to improve accuracy of a three-dimensional object obtained through stereolithography, in which a plurality of modified object's layers is cured to obtain a facing-up stepped surface, on which a meniscus of the liquid material is formed that is subsequently cured.

The present invention intends to eliminate said drawbacks that are typical of the stereolithography methods of known type.

In particular, it is the object of the present invention to provide a stereolithography method that makes it possible to limit the distortions of a three-dimensional object compared to the results that can be obtained with the known methods described above, while ensuring the same degree of definition.

Said object is achieved by a stereolithography method according to claim 1.

Said object is also achieved by an apparatus according to claim 17, as well as by a computer program product according to claim 18.

The fact that the above mentioned object has been achieved will be clear in the following description of some preferred embodiments of the invention, provided by way of non-limiting example with reference to the attached drawings, wherein:

FIGS. 3, 4 and 5 show respective operating steps of a stereolithography method according to the known art, applied to the portion of the object of FIG. 1;

Figure 1:
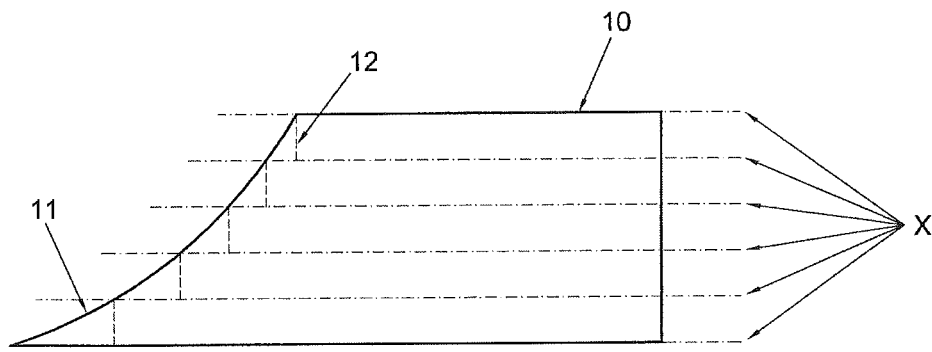
FIG. 1 shows a portion of a three-dimensional object.
Figure 11:
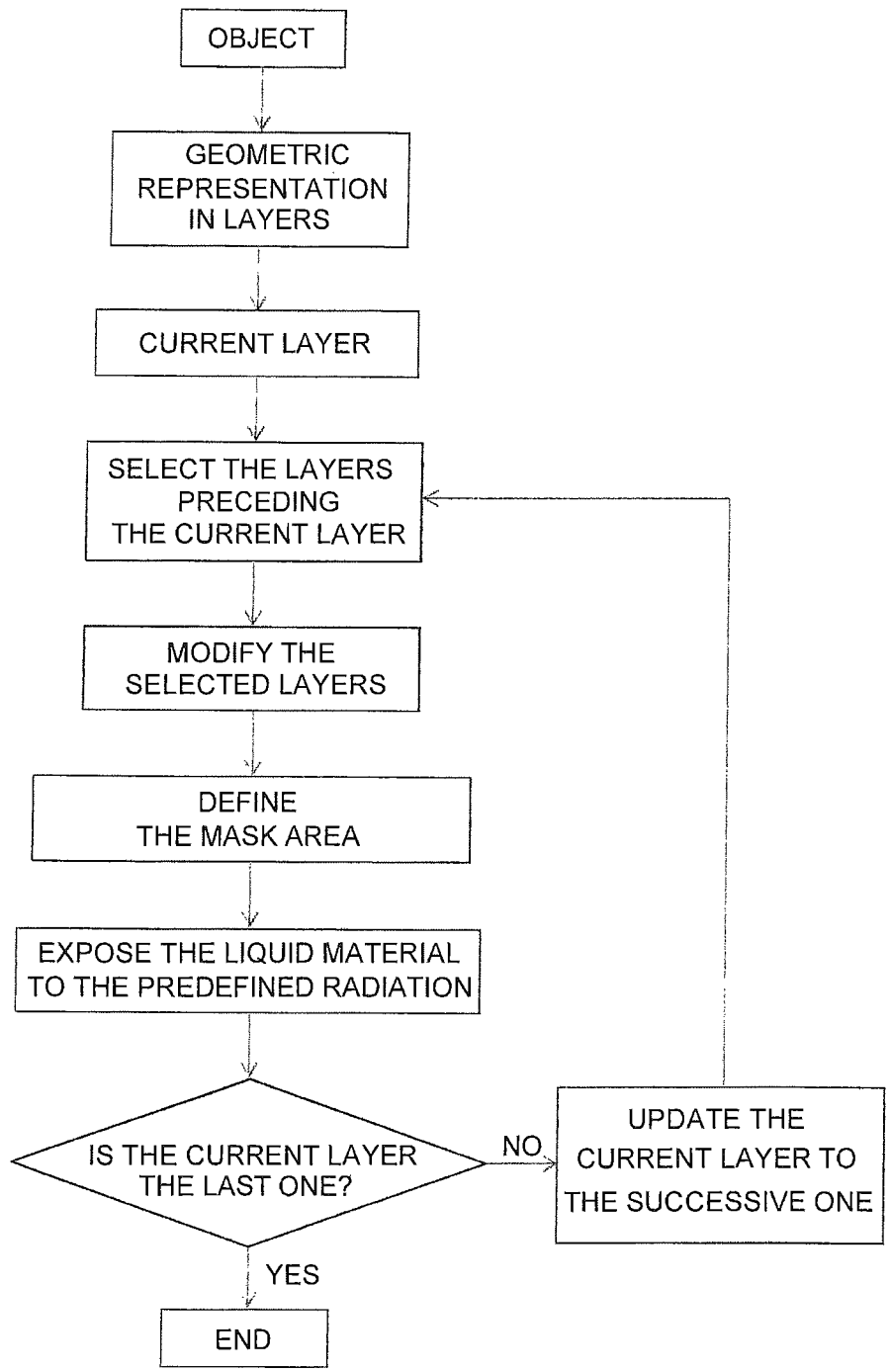

FIGS. from 6 to 10 show respective operating steps of the stereolithography method of the invention applied to the portion of the object of FIG. 1;

FIG. 11 shows a block diagram illustrating the method of the invention.

The stereolithography method that is the subject of the invention is suited to produce a three-dimensional object through the superimposition of a succession of layers, each one of which is obtained from a corresponding layer of liquid material that is selectively solidified through exposure to predefined radiation.

Said liquid material is preferably a light sensitive resin.

Furthermore, the predefined radiation is preferably a laser beam that is directed in such a way that it is progressively incident on the entire surface of the layer of liquid material corresponding to the portion to be solidified.

According to a variant embodiment of the invention, the predefined radiation is emitted by a projector suited to simultaneously irradiate the entire surface of the layer of liquid material corresponding to the portion to be solidified.

In any case, the radiation preferably propagates in a direction that is substantially perpendicular to the surface of the liquid material corresponding to the portion to be solidified.

The method that is the subject of the invention is particularly advantageous to produce objects having portions that project with respect to other portions that are solidified before them.

Figure 2:
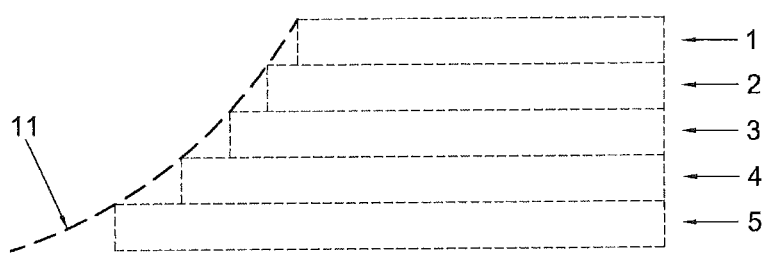
FIG. 2 shows a representation of the portion of the object of FIG. 1 in layers.

Only by way of example, the method will be described with reference to the portion of three-dimensional object 10 represented in FIG. 1 and to its possible subdivision in five layers 1, 2, 3, 4, 5 represented in FIG. 2.

As already mentioned, the layers are numbered according to their solidification order: layer 1 is the layer that is solidified first, while layer 5 is the layer that is solidified last.

Furthermore, it should be noted that each one of the layers 2-5 has a portion that projects with respect to the previous layer.

In any case, it is clear that the method of the invention can be applied to three-dimensional objects having any shape.

As schematically shown in FIG. 11, the stereolithography method of the invention includes, first of all, the operation of defining a geometric representation of each layer of the succession of layers into which the three-dimensional object to be produced has been divided.

Preferably, said geometric representation will assume the form of a set of data, which can be processed by the logic processing unit of a computer.

It should be noted that, for the sake of simplicity, here below reference will be made to a generic layer in order to indicate both the corresponding solidified layer of the three-dimensional object and the geometric representation of said layer for the purpose of application of the method of the invention; in any case, the context will clarify the relevant meaning from time to time.

In particular, the expression "modified layer" means the modified geometric representation of the corresponding layer.

It should furthermore be noted that the expression "current layer" indicates the layer that has to be solidified from time to time.

The method includes the use of the vertical compensation procedure already described above, for at least one current layer of the succession of layers.

Said compensation procedure includes the selection of one or more layers that precede said current layer in the succession of layers.

Figure 6:
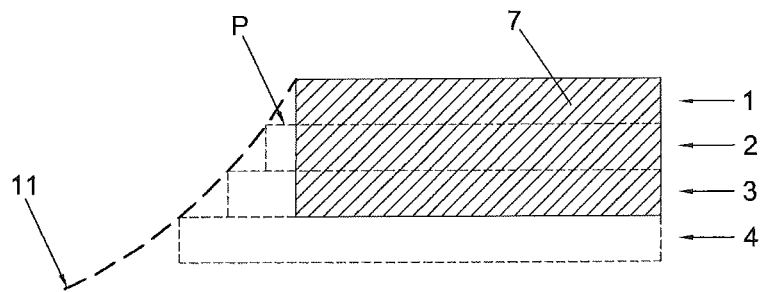

FIG. 6 illustrates, by way of example, the situation in which the current layer (to be solidified) is layer 4, while the layers 1, 2, 3 have already been partially solidified at the level of the hatched area 7. The hatching represents the layers 1-4 as they result from their respective geometric representations.

Figure 7:
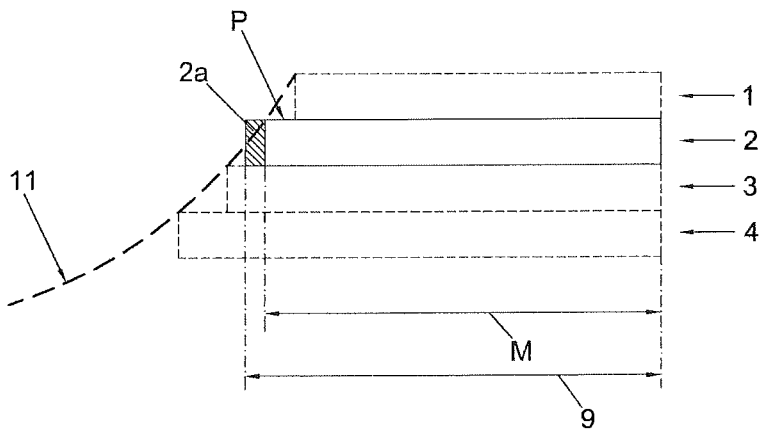

FIG. 7 illustrates the operation of selection of the layers preceding the current layer 4, which in this case includes the selection of the layer 2 only, indicated by a continuous line.

According to the method, furthermore, a mask area 9 is defined that extends until the logical conjunction of the current layer 4 with the selected layer 2.

As already mentioned above, the logical conjunction of the layers corresponds to the intersection of said layers reproduced on a single reference plane, for example the plane of the current layer, through a geometric operation of translation in a direction that is parallel to the direction of propagation of the predefined radiation 6.

In the case at hand, the mask area 9 corresponds to the area of said reference plane towards which both the current layer 4 and the selected layer 2 face at the same time.

Obviously, said reference plane is a conventional entity used to describe the method used to define the mask area 9. Therefore, its position does not affect the geometry of the mask area 9.

In fact, the mask area 9 is not positioned along the axis that is orthogonal to the layers of the object, as it does not represent a layer of the object, but rather a geometric area that represents the portion of the surface of the liquid material to be solidified for each layer.

Figure 8:
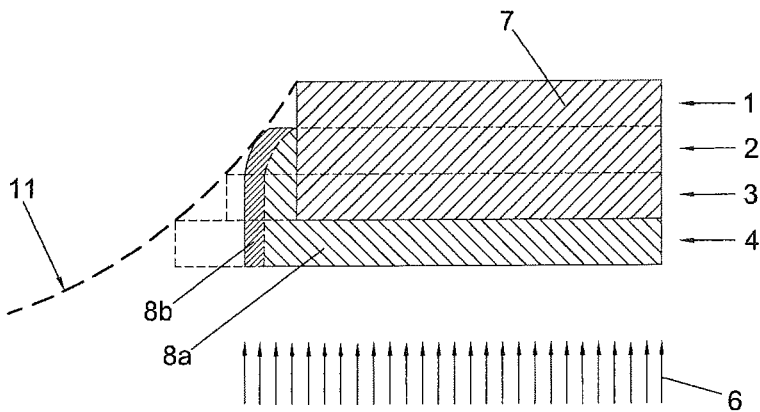

After the definition of the mask area 9, the method includes the exposure of the liquid material to the predefined radiation 6 in the area corresponding to said mask area 9, as shown in FIG. 8.

According to a variant embodiment, the mask area 9 is defined only for the portion of the three-dimensional object adjacent to its outline 11.

The areas corresponding to the inner portions of the object can be solidified using a less precise method, according to which a plurality of layers is solidified through a single exposure and not through an exposure for each layer, with the advantage of reducing the time necessary to produce the object. According to the invention, before defining the mask area 9 the geometric representations of the selected layers are modified in such a way as to extend them with respective additional portions that project beyond the corresponding geometric representations as configured before the modification.

The operation described above is schematically represented in FIG. 7, in which it can be observed that the layer 2, represented by the rectangle drawn with a continuous line, is expanded with an additional portion 2a that is represented by a hatched rectangle projecting with respect to the layer 2 as configured before the modification.

As the layer 2 expanded as indicated above extends over the entire area of the current layer 4, the logical conjunction of the expanded layer 2 and the current layer 4 will originate a mask area 9 comprising also said additional portion 2a.

Therefore, the mask area 9 is larger than the mask area M that can be obtained through the method of the known art, as can be directly observed in FIG. 7.

In particular, the portion that is theoretically solidified by the predefined radiation at the level of the layer 2 projects beyond the outline 11 of the object. However, due to the phenomena explained above, the portion that is solidified effectively is limited to the area that is closest to the previously solidified portion of the object.

In FIG. 8 the portion of liquid material in which an effective solidification process takes place is hatched, wherein the solidified portion 8a that corresponds to that which would be solidified using the known method is represented using thin hatching, while the further portion 8b that is solidified following application of the method of the invention is represented using thicker hatching.

The portion 8b comprises only a part of the portion that would theoretically be solidified if the effect of the predefined radiation on the liquid material were uniform.

More precisely, the effective solidification takes place only in a part of the liquid material that is adjacent to the previously solidified portion 7, while the remaining part is solidified to an insufficient degree and therefore tends to come off during the successive processing steps.

Said solidified part is larger for the surface layers than for the deeper layers: for example, the solidified part at the level of the layer 2 is considerably reduced compared to the theoretical one, as clearly shown in FIG. 8.

By properly selecting the size of the additional portion 2a, it is possible to proceed in such a way that the actually solidified portion approximates more precisely the outline 11 of the object compared to that which happens with the known method.

Therefore, it can be understood that the method of the invention makes it possible to reproduce the three-dimensional object in a more precise manner compared to the results than can be obtained with the known methods, thus limiting its distortions and thus achieving the object of the invention.

Even if in the example described above only one layer is modified, variant embodiments of the invention may include the selection of a larger number of layers for each current layer, in which case the mask area is defined as the logical conjunction of the current layer and all the selected layers.

Obviously, the selection of a larger number of previous layers allows the degree of precision of the object to be increased, as it makes it possible to define the mask area not only according to the size of the layers, but also according to the outline of the object, meaning its more or less marked curvature and its more or less marked inclination with respect to the plane of the layers.

On the other hand, a larger number of selected layers causes also an increase in the calculation time and, therefore, in the overall time needed to process the object.

The number of selected layers is therefore decided based on the most important aspects between the two mentioned above.

In order to obtain the highest precision, all the layers included within the solidification depth are preferably selected, that is, all the layers that are spaced from the current layer 4 by a distance that is shorter than the solidification depth less the thickness of the current layer 4.

For example, in the case illustrated in FIGS. 6-8, it is possible to select and modify also the layer 3, in addition to the layer 2.

In order to reduce the calculation time, according to a variant embodiment only part of the layers included within the solidification depth are selected.

Preferably, at least two layers are selected: the layer located at the solidification depth, that is, the one provided with at least one section arranged at said depth, and an intermediate layer between the previous layer and the current layer.

According to a further variant embodiment, the mask area is defined also taking account of the layers that are included within the solidification depth but are not selected, using, for the latter, corresponding interpolations based on the selected layers.

In any case, it is preferable that the layer arranged at the solidification depth be selected or, however, considered during the definition of the mask area, since this is the last layer that may hinder the propagation of the radiation in those areas of the liquid material whose solidification has to be avoided.

As regards the optimal size of the additional portion of the modified layers, this depends on several parameters, including the shape of the object, the size, shape and frequency of the predefined radiation, the physical characteristics of the resin, and so on.

Said parameters are preferably set from time to time, based on the data obtained from experimentation on objects with similar geometry and/or based on the operator's expertise.

Preferably, the smallest among the additional portions 2a used to modify the selected layers has a size included between ¼ of and twice the effective width of the predefined radiation 6 at the level of the surface of the liquid material.

Said effective width is defined as twice the distance between the point of the incidence area of the predefined radiation 6 corresponding to the maximum energy and the point of the incidence area corresponding to the minimum energy sufficient to cause the liquid material to solidify.

In the case of predefined radiation 6 in the form of a laser beam with substantially circular cross section, said width corresponds to the diameter of the area within which the energy is sufficient to cause the liquid material to solidify, commonly indicated by the word "spot" in technical jargon.

Tests carried out by the applicant filing the present invention showed that the use of additional portions 2a having said minimum size makes it possible to achieve good results in most cases.

Preferably, the layers are modified in such a way that the sizes of the respective additional portions, meaning the distance by which said additional portions project with respect to the corresponding layers as configured before the modification, are the same for all of the layers to be modified.

According to a variant embodiment, said size varies among the layers to be modified and is calculated, for each layer to be modified, according to the distance of the latter from the current layer to be modified.

Preferably, said size increases as the distance of each layer to be modified from the current layer increases, and therefore said function is an increasing function.

According to a variant embodiment of the invention, said size decreases as the distance of each layer to be modified from the current layer increases, and therefore said function is a decreasing function.

In both of the cases just described above, in which the sizes of the additional portions increase or decrease as the distance of the respective layers from the current layer varies, said size is preferably calculated as a linear function of the distance between the layer to be modified and the current layer, in such a way that the size calculated for each layer to be modified increases or decreases in proportion to the distance between the layer itself and the current layer.

The linear function offers the further advantage of allowing a quicker calculation of the modified layers.

According to a different variant embodiment, said size is calculated as an exponential function of the distance between the layer to be modified and the current layer.

In all of the above mentioned cases, preferably, each layer is modified in such a way that the size of the corresponding additional portion is uniform along the edges of the layer itself.

Figure 9:
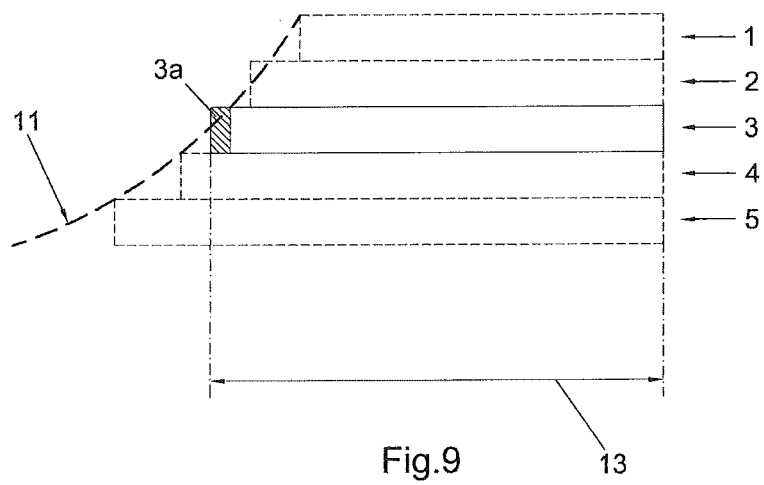

Preferably, according to the method, once the mask area 9 corresponding to the layer 4 has been defined, also the mask area 13 corresponding to the successive layer 5 is defined, as illustrated in FIG. 9.

In this case, the layer 3 is selected, which is modified through the addition of the portion 3a and according to which the mask area 13 is then calculated.

Figure 10:
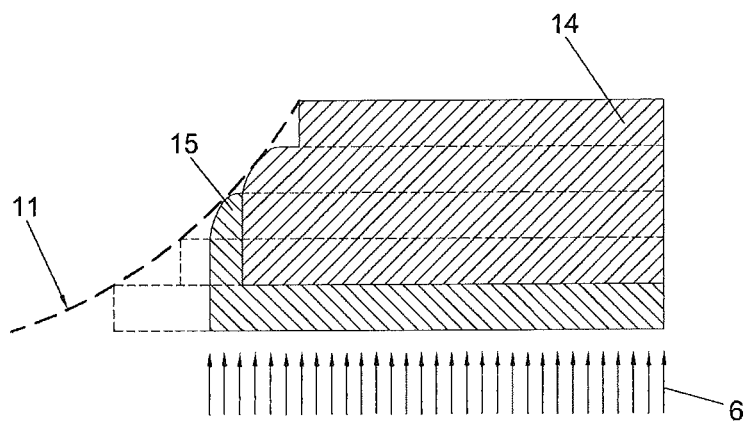

The result obtained from the exposure of the liquid material to the predefined radiation 6 in the mask area 13 is represented in FIG. 10, in which the portion that has solidified following exposure is the hatched portion 15, while the portion 14 hatched in a different manner corresponds to the previously solidified one, represented by the sum of the portions 8a and 8b of FIG. 8.

Obviously, the method can include the same operations described above also for other successive layers of the object.

The operations described above are preferably repeated for each one of the layers of a group of consecutive layers, defined in such a way that each layer of the group projects with respect to the previous layer, as in the case of layers from 2 to 5 mentioned above. Obviously, said group of layers defines an area of the three-dimensional object that projects with respect to the previous area and is oriented in the opposite direction with respect to the direction of propagation of the predefined radiation 6.

According to a variant embodiment of the method, the operation of defining the mask area may be performed only for the layers of the object that are provided with projecting portions.

Advantageously, this variant makes it possible to reduce the overall calculation time and, therefore, the overall time necessary to produce the object, without affecting processing precision. In fact, the effect of partial solidification previously described and, therefore, the advantage offered by vertical compensation can be noticed on the layers provided with projecting portions.

According to this variant, the layers for which no mask area is defined are exposed to the predefined radiation over their entire area.

According to a further variant embodiment of the method of the invention, the modifications to the layers made during the definition of the mask area of any current layer are summed to the modifications made on the same layers during the definition of the mask areas corresponding to previous layers.

In fact, it should be considered that, when the mask areas are defined based on a plurality of previous layers, it usually happens that one layer takes part in the definition of several mask areas corresponding to several different layers and, therefore, is modified more than once.

For example, considering the case illustrated in FIGS. 6-8, if the mask area corresponding to the layer 4 were defined based on the two immediately preceding layers 2 and 3, these layers would be modified according to the method described above.

The mask area corresponding to the successive layer 5 would be defined based on the respective two immediately preceding layers 3 and 4, which therefore would be modified.

According to the variant just described above, the second modification to the layer 3 is added to the modification to the layer 3 already made during the definition of the previous mask area.

According to a different variant embodiment, in the definition of the mask area only those layers are modified which have not already been modified during the definition of the mask areas corresponding to the previous layers.

In this case, always with reference to FIGS. 6-8, if the mask area corresponding to the layer 4 is defined after modifying the layers 2 and 3, the mask area corresponding to the layer 5 is defined after modifying only the layer 4, as the layer 3 has already been modified.

Obviously, the variants just described above can be combined to the preceding variants, both individually and in combination with one another.

According to a further aspect of the invention, the operations related to the definition of the mask areas described above are performed by means of a processing apparatus comprising a logic processing unit and storage means accessible by the processing unit, for example a computer.

The apparatus comprises means for acquiring the set of data comprising the geometric representation of the layers of the object and means for acquiring said set of data and loading it in the storage means.

The apparatus comprises also data processing means for processing the set of data in such a way as to perform the operations corresponding to the selection of the layers to be modified for each current layer and to the definition of the corresponding mask area, as described above.

According to a further aspect of the invention, said means for performing said operations of acquisition and modification of the set of data are obtained through the execution of corresponding portions of program by said logic processing unit.

The present invention, therefore, concerns also the computer program product comprising a data support provided with said program portions.

According to the above, it can thus be understood that the stereolithography method described above, as well as the apparatus that performs the processing operations on the set of data according to said method and the computer program product that contains the program portions suitable to carry out said processing operations on said apparatus achieve the object of the invention.

In particular, the definition of the mask area of each current layer, based on geometric representations of the preceding layers of the object, modified in such a way as to expand them, makes it possible to expose the liquid material to the predefined radiation in a more precise manner and thus makes it possible to reduce the distortions on the three-dimensional object actually obtained.

The invention claimed is:

1. Stereolithographic method for making a three-dimensional object through superimposition of a succession of layers obtained from a liquid material suited to be solidified following exposure to predefined radiation, said method comprising defining a geometric representation of each layer of said succession of layers, and further comprising a sequence of operations, carried out for at least one reference layer of said succession of layers said sequence of operations comprising:

selecting one or more layers preceding said reference layer according to said succession of layers;

defining a first mask area corresponding to a logical conjunction of the geometric representations of said reference layer and of said one or more layers reproduced on a plane of said reference layer;

exposing said liquid material to said predefined radiation in said first mask area;

wherein said sequence of operations comprises, before the operation of defining said first mask area, modifying the geometric representations of said one or more layers in such a way as to extend them with corresponding additional portions that project with respect to the geometric representations of the respective layers as configured before said modification, wherein said additional portions are defined in such a way as to compensate for a reduced solidifying effect of said predefined radiation on said liquid material due to the penetration of said predefined radiation in said liquid material down to a depth corresponding to said one or more layers, so that an outline of a portion of said three-dimensional object obtained following the solidification of said group of layers approximates more precisely an outline of said three-dimensional object compared to that which would be obtained in absence of said additional portions.

2. Method according to claim 1, wherein said additional portions are defined based on one or more parameters amongst: shape and size of a portion of said three-dimensional object corresponding to said group of layers; shape and frequency of said predefined radiation; physical properties of said liquid material.

3. Method according to claim 1, wherein said succession of layers comprises at least one group of consecutive layers, each one of which is provided with a portion that projects with respect to the preceding layer, said method comprising the selection in sequence of the layers of said group of layers according to the order in which said layers appear in said succession of layers and the performance of said sequence of operations for each selected layer, considered as reference layer.

4. Method according to claim 1, wherein said one or more layers comprise at least two mutually non-adjacent layers of said succession of layers.

5. Method according to claim 1, wherein said one or more layers comprise a plurality of mutually adjacent layers of said succession of layers.

6. Method according to claim 1, wherein said one or more layers comprise at least one layer such that a sum of the thicknesses of said at least one layer, said reference layer and all intermediate layers thereby, is at least equal to the maximum depth at which said predefined radiation is capable of solidifying said liquid material and make said liquid material adhere to a previously solidified layer of said three-dimensional object.

7. Method according to claim 1, wherein each one of said one or more layers is spaced from said reference layer by a distance that does not exceed the maximum depth at which said predefined stimulation is capable of solidifying said liquid material and make said liquid material adhere to a previously solidified layer of said three-dimensional object, less the thickness of said reference layer.

8. Method according to claim 1, wherein said operation of modifying said geometric representation is carried out in such a way that all of said additional portions project by the same distance beyond the corresponding one or more layers as configured before said modification.

9. Method according to claim 1, wherein said operation of modifying said geometric representation is carried out in such a way that the additional portion corresponding to each layer of said one or more layers projects beyond the respective layer as configured before the modification by a distance which is calculated as a function of the distance of said layer from said reference layer.

10. Method according to claim 9, wherein said function decreases as said distance of said layer from said reference layer increases.

11. Method according to claim 9, wherein said function increases as said distance of said layer from said reference layer increases.

12. Method according to claim 10, wherein said function is exponential.

13. Method according to claim 7, wherein each one of said additional portions projects beyond the respective layer as configured before the modification by a uniform distance.

14. Method according to claim 1, wherein, after said operation of defining said first mask area, and for at least one second layer following said reference layer in said succession of layers:

selecting one or more further layers preceding said second layer in said succession of layers;

excluding from said one or more further layers said one or more layers selected before said operation of defining said first mask area;

modifying the geometric representations of the layers remaining after said operation of exclusion, in such a way as to extend them by corresponding additional portions projecting with respect to the geometric representations of the corresponding layers as configured before modification;

defining a second mask area corresponding to a logical conjunction of the geometric representations of said second layer and of said one or more further layers as configured after modification.

15. Method according to claim 1, wherein said additional portions are defined in such a way that the additional portions project beyond an outline of said three-dimensional object.

16. Method according to claim 1, wherein the smallest of the additional portions used in modifying the geometric representations of said one or more layers has a size included between ¼ of and twice the effective width of said predefined radiation at the level of a surface of the liquid material.

17. Method according to claim 11, characterized in that said function is exponential.

18. Method according to claim 1, wherein said predefined radiation is a laser beam.

* * * * *